United States Patent

Jonen et al.

[11] Patent Number: 5,860,883
[45] Date of Patent: Jan. 19, 1999

[54] POWER TRANSMISSION BELT

[75] Inventors: Hiroshi Jonen, Nishinomiya; Yoshiaki Onaka, Hyogo; Takehiko Ito, Hyogo; Hideaki Kawano, Hyogo; Yukitoshi Kanai, Hyogo, all of Japan

[73] Assignee: Mitsuboshi Belting Ltd., Hyogo, Japan

[21] Appl. No.: 845,690

[22] Filed: Apr. 25, 1997

[51] Int. Cl.$^6$ .................................................. F16G 1/28
[52] U.S. Cl. ............................................ 474/205; 474/271
[58] Field of Search .................................. 474/205, 204, 474/250, 260, 263–271

[56] References Cited

U.S. PATENT DOCUMENTS

| | | | |
|---|---|---|---|
| 5,458,544 | 10/1995 | Fujiwara et al. | 474/205 |
| 5,478,286 | 12/1995 | Hamano et al. | 474/205 |
| 5,484,341 | 1/1996 | Fujuwara et al. | 474/205 |
| 5,599,246 | 2/1997 | Fujiwara et al. | 474/205 |
| 5,609,541 | 3/1997 | Tachibana et al. | 474/205 |

FOREIGN PATENT DOCUMENTS

| | | |
|---|---|---|
| 311158/1989 | 12/1989 | Japan . |
| 217472/1993 | 10/1993 | Japan . |

*Primary Examiner*—Thomas R. Hannon
*Attorney, Agent, or Firm*—Wood, Phillips, VanSanten, Clark and Mortimer

[57] ABSTRACT

A power transmission belt has a body with a) a cushion rubber layer and b) a compression rubber layer disposed on the cushion rubber layer. The cushion rubber layer has load carrying cords embedded therein and a first rubber composition including a hydrogenated nitrile rubber, an unsaturated carboxylic acid metal salt, silica, and inorganic peroxide. The compression rubber layer has a second rubber composition including a hydrogenated nitrile rubber, an unsaturated carboxylic acid metal salt, and an organic peroxide.

29 Claims, 2 Drawing Sheets

POWER TRANSMISSION BELT

BACKGROUND OF THE INVENTION

1. Technical Field

The present invention is directed to power transmission belts, and in particular, to power transmission belts having a laminar construction.

2. Background Art

It is known in the art to fabricate power transmission belts for automobile engines by embedding load carrying cords in a layer of chloroprene rubber. This method and these materials have been used to fabricate power transmission belts for use in the automobile industry for many years.

However, modem automobile engines are designed to operate at higher temperatures and at higher speeds than older automobile engines. As a consequence, demands are being put on the power transmission belts for these engines that cannot be met using the standard chloroprene rubber construction. Chloroprene rubber is known to cure easily in a high temperature environment, such as is found in a modern automobile engine compartment. This curing of the chloroprene rubber may lead to premature cracking in the belt, which may ultimately lead to premature belt failure.

Additionally, in such a high temperatures environment, chloroprene rubber has been known to fail to adequately adhere to the load carrying cords embedded therein. As a result, the chloroprene rubber may "peel" off the load carrying cords, causing the cords to "pop out", thereby potentially reducing the transmission belt life and leading to premature belt failure.

Moreover, transmission belts made from chloroprene rubber may not be able to withstand the side pressures exerted on the transmission belts by the pulleys into which the belt is fitted. The poor resistance to side pressure may result in a buckling deformation of the belt known as dishing. Dishing can make it impossible to effectively transmit power through the belt.

Many alternative materials have been tried in the art as alternatives to chloroprene rubber. For example, Japanese Laid Open Application No. 271,472/1993 discloses an alternative material formulated from a hydrogenated nitrile rubber and an unsaturated carboxylic acid metal salt, such as zinc methylacrylate. Japanese Laid Open Application No. 311,158/1989 discloses a second, alternative material formulated from a hydrogenated nitrile rubber or a rubber composition obtained by mixing a hydrogenated nitrile rubber with an unsaturated carboxylic acid metal salt, such as zinc methacrylate, for example, and an organic peroxide.

The material disclosed in Japanese Laid Open Application No. 271,472/1993 may still experience a high degree of "pop out" because of the hardness of the rubber. Additionally, the material may not exhibit sufficient resistance to side pressure when the material is placed in compression.

The material disclosed in Japanese Laid Open Application No. 311,158/1989 may not permit the practical use of conventional reinforcing and strengthening materials, such as carbon black and short fibers. In fact, use of carbon block and short fibers may actually decrease the strength of the rubber. Moreover, without some type of reinforcement, the disclosed material may not exhibit sufficient resistance to side pressures, or to flexing fatigue.

The present invention is directed toward overcoming one or more of the problems discussed above.

BRIEF SUMMARY OF THE INVENTION

According an aspect of the present invention, a power transmission belt includes a body including a cushion rubber layer with a load carrying cord embedded therein. The cushion rubber layer includes a first rubber composition including a hydrogenated nitrile rubber, an unsaturated carboxylic acid metal salt, silica and an organic peroxide. The body also includes a compression rubber layer disposed on the cushion rubber layer. The compression rubber layer includes a second rubber composition including a hydrogenated nitrile rubber, an unsaturated carboxylic acid metal salt, and an organic peroxide.

Moreover, the second rubber composition may include short fibers, the short fibers selected from the group consisting of cotton fibers, polyester fibers, polyamide fibers and aramid fibers. The amount of short fibers in the second rubber composition may be approximately 5 to 40 parts by weight per 100 parts by weight of the second rubber composition.

Moreover, in the first rubber composition, the hydrogenated nitrile rubber may be a hydrogenated nitrile rubber having a Mooney viscosity of approximately 70 to 85 and the unsaturated carboxylic acid metal salt may be formed by ionically bonding an unsaturated carboxylic acid selected from the group consisting of monocarboxylic acids, such as acrylic acid and methacrylic acid; and dicarboxylic acids, such as maleic acid, fumaric acid, and itaconic acid and a metal selected from the group consisting of beryllium, magnesium, calcium, strontium, barium, titanium, chromium, molybdenum, manganese, iron, cobalt, nickel, copper, silver, zinc, cadmium, aluminum, tin, lead, and antimony. The ratio of hydrogenated nitrile rubber to unsaturated carboxylic acid meal salt may be between 98:2 and 55:45. The organic peroxide may be an organic peroxide selected from the group consisting of di-tert-butyl peroxide, dicumyl peroxide, tert-butylcumyl peroxide, 1.1-tert-butylperoxy-3.3.5-trimethylcyclohexane, 2.5-dimethyl-2.5-di(tert-butylperoxy)hexane, 2.5-dimethyl-2.5di-(tert-butylperoxy)hexane-3, bis(tert-butylperoxydiisopropyl)) benzene, 2.5-dimethyl-2.5-di(benzoylperoxy)hexane, tert-butyl peroxybenzoate, and tert-butylperoxy-2-ethylhexyl carbonate in an amount of approximately 0.2 to 10 parts by weight per 100 parts by weight of the first rubber composition.

Moreover, in the second rubber composition, the hydrogenated nitrile rubber may be a hydrogenated nitrile rubber having a Mooney viscosity of approximately 70 to 85 and the unsaturated carboxylic acid metal salt may be formed by ionically bonding an unsaturated carboxylic acid selected from the group consisting of monocarboxylic acids, such as acrylic acid and methacrylic acid; and dicarboxylic acids, such as maleic acid, fumaric acid, and itaconic acid and a metal selected from the group consisting of beryllium, magnesium, calcium, strontium, barium, titanium, chromium, molybdenum, manganese, iron, cobalt, nickel, copper, silver, zinc, cadmium, aluminum, tin, lead, and antimony. The ratio of hydrogenated nitrile rubber to unsaturated carboxylic acid metal salt may be between 98:2 and 55:45. The organic peroxide may be an organic peroxide selected from the group consisting of di-tert-butyl peroxide, dicumyl peroxide, tert-butylcumyl peroxide, 1.1-tert-butylperoxy-3.3.5-trimethylcyclohexane, 2.5-dimethyl-2.5-di(tert-butylperoxy)hexane, 2.5-dimethyl-2.5-di(tert-butylperoxy)hexane-3, bis(tert-butylperoxydlisopropyl)) benzene, 2.5-dimethyl-2.5-di(benzoylperoxy)hexane, tert-butyl peroxybenzoate, and tert-butylperoxy-2-ethylhexyl carbonate in an amount of approximately 0.2 to 10 parts by weight per 100 parts by weight of the second rubber composition.

Moreover, the first rubber composition may includes silica in an amount of approximately 5 to 50 parts by weight per 100 parts by weight of the first rubber composition.

Moreover, the first rubber composition may further include a basic substance selected from the group consisting of magnesium oxide, triethanolamine, diphenylguanidine and hexamethylenetetramine in an amount of approximately 0.5 to 10 parts by weight per 100 parts by weight of the first rubber composition.

Moreover, the second rubber composition may further include a basic substance selected from the group consisting of magnesium oxide, triethanolamine, diphenylguanidine and hexamethylenetetramine in an amount of approximately 0.5 to 10 parts by weight per 100 parts by weight of the second rubber composition.

Moreover, the body may further include a crack-resisting layer disposed on the compression rubber layer and comprising a substantially fiber-free, substantially carbon black-free rubber composition comprising a hydrogenated nitrile rubber, an unsaturated carboxylic acid metal salt, and an organic peroxide.

In another aspect of the invention, a power transmission belt includes a body including a cushion rubber layer with a load carrying cord embedded therein, the cushion rubber layer including a first rubber composition. The body also includes a compression rubber layer disposed on the cushion rubber layer and including a second rubber composition. The second rubber composition includes a hydrogenated nitrile rubber, an unsaturated carboxylic acid metal salt, short fibers and an organic peroxide. The body further includes a crack-resisting layer disposed on the compression rubber layer and including a substantially fiber-free, substantially carbon black-free rubber composition including a hydrogenated nitrile rubber, an unsaturated carboxylic acid metal salt, and an organic peroxide.

Moreover, first rubber composition may be selected from the group consisting of a hydrogenated nitrile rubber having dispersed therein an unsaturated carboxylic acid metal salt, a hydrogenated nitrile rubber, a chlorosulfonated polyethylene, a natural rubber, a chloroprene rubber, a styrene butadiene rubber, a butadiene rubber or a blend thereof Moreover, the first rubber composition may include a hydrogenated nitrile rubber is a hydrogenated nitrile rubber having a Mooney viscosity of approximately 70 to 85. The first rubber composition may also include an unsaturated carboxylic acid metal salt formed by ionically bonding an unsaturated carboxylic acid selected from the group consisting of monocarboxylic acids, such as acrylic acid and methacrylic acid; and dicarboxylic acids, such as maleic acid, fumaric acid, and itaconic acid and a metal selected from the group consisting of beryllium, magnesium, calcium, strontium, barium, titanium, chromium, molybdenum, manganese, iron, cobalt, nickel, copper, silver, zinc, cadmium, aluminum, tin, lead, and antimony. The ratio of hydrogenated nitrile rubber to unsaturated carboxylic acid meal salt may be between 98:2 and 55:45. The first rubber may also include silica in an amount of approximately 5 to 50 parts by weight per 100 parts by weight of the first rubber composition and an organic peroxide is an organic peroxide selected from the group consisting of di-tert-butyl peroxide, dicumyl peroxide, tert-butylcumyl peroxide, 1.1-tert-butylperoxy-3.3.5-trimethylcyclohexane, 2.5-dimethyl-2.5-di(tert-butylperoxy)hexane, 2.5-dimethyl-2.5-di(tert-butylperoxy)hexane-3, bis(tert-butylperoxydiisopropyl))benzene, 2.5-dimethyl-2.5-di(benzoylperoxy)hexane, tert-butyl peroxybenzoate, and tert-butylperoxy-2-ethylhexyl carbonate in an amount of approximately 0.2 to 10 parts by weight per 100 parts by weight of the first rubber composition.

Moreover, in the second rubber composition, the hydrogenated nitrile rubber may be a hydrogenated nitrile rubber having a Mooney viscosity of approximately 70 to 85. The unsaturated carboxylic acid metal salt may be formed by ionically bonding an unsaturated carboxylic acid selected from the group consisting of monocarboxylic acids, such as acrylic acid and methacrylic acid; and dicarboxylic acids, such as maleic acid, fumaric acid, and itaconic acid and a metal selected from the group consisting of beryllium, magnesium, calcium, strontium, barium, titanium, chromium, molybdenum, manganese, iron, cobalt, nickel, copper, silver, zinc, cadmium, aluminum, tin, lead, and antimony. The ratio of hydrogenated nitrile rubber to unsaturated carboxylic acid meal salt may be between 98:2 and 55:45. The short fibers may be selected from the group consisting of cotton fibers, polyester fibers, polyamide fibers and aramid fibers in an the amount of approximately 5 and 40 parts by weight per 100 parts by weight of the second rubber composition and the organic peroxide may be an organic peroxide selected from the group consisting of di-tert-butyl peroxide, dicumyl peroxide, tert-butylcumyl peroxide, 1.1-tert-butylperoxy-3.3.5-trimethylcyclohexane, 2.5-dimethyl-2.5-di(tert-butylperoxy)hexane, 2.5-dimethyl-2.5-di(tert-butylperoxy)hexane-3, bis(tert-butylperoxydiisopropyl))benzene, 2.5-dimethyl-2.5-di(benzoylperoxy)hexane, tert-butyl peroxybenzoate, and tert-butylperoxy-2-ethylhexyl carbonate in an amount of approximately 0.2 to 10 parts by weight per 100 parts by weight of the second rubber composition.

Moreover, in the substantially fiber-free, substantially carbon black-free rubber composition, the hydrogenated nitrile rubber may be a hydrogenated nitrile rubber having a Mooney viscosity of approximately 70 to 85. The unsaturated carboxylic acid metal salt may be formed by ionically bonding an unsaturated carboxylic acid selected from the group consisting of monocarboxylic acids, such as acrylic acid and methacrylic acid; and dicarboxylic acids, such as maleic acid, fumaric acid, and itaconic acid and a metal selected from the group consisting of beryllium, magnesium, calcium, strontium, barium, titanium, chromium, molybdenum, manganese, iron, cobalt, nickel, copper, silver, zinc, cadmium, aluminum, tin, lead, and antimony. The ratio of hydrogenated nitrile rubber to unsaturated carboxylic acid meal salt may be between 98:2 and 55:45. The organic peroxide may be an organic peroxide selected from the group consisting of di-tert-butyl peroxide, dicumyl peroxide, tert-butylcumyl peroxide, 1.1-tert-butylperoxy-3.3.5-trimethylcyclohexane, 2.5-dimethyl-2.5-di(tert-butylperoxy)hexane, 2.5-dimethyl-2.5-di(tert-butylperoxy)hexane-3, bis(tert-butylperoxydiisopropyl))benzene, 2.5-dimethyl-2.5-di(benzoylperoxy)hexane, tert-butyl peroxybenzoate, and tert-butylperoxy-2-ethylhexyl carbonate in an amount of approximately 0.2 to 10 parts by weight per 100 parts by weight of the second rubber composition.

In a further aspect of the invention, a power transmission belt includes a body having a cushion rubber layer with a load carrying cord embedded therein, the cushion rubber layer comprising a first rubber composition comprising a hydrogenated nitrile rubber, an unsaturated carboxylic acid metal salt, silica and an organic peroxide. The body also includes a compression rubber layer disposed on the cushion rubber layer and comprising a second rubber composition comprising a hydrogenated nitrile rubber, an unsaturated carboxylic acid metal salt, short fibers and an organic peroxide. The body further includes a crack-resisting layer disposed on the compression rubber layer and comprising a substantially fiber-free, substantially carbon black-free rubber composition comprising a hydrogenated nitrile rubber, an unsaturated carboxylic acid metal salt, and an organic peroxide.

Moreover, the compression rubber layer may have a first surface in which teeth or cogs are formed at regularly spaced intervals, and the crack-resisting layer is disposed on the first surface of the compression rubber layer.

Moreover, the body may further include an outer compression rubber layer disposed on the crack-resisting layer, the crack-resisting layer disposed between the compression rubber layer and the outer compression rubber layer.

Moreover, the cushion rubber layer may have upper and lower surfaces. The compression layer may be disposed on the lower surface. The body may further include a tension rubber layer disposed on the upper surface of the cushion rubber layer, the tension rubber layer including a third rubber composition comprising a hydrogenated nitrile rubber, an unsaturated carboxylic acid metal salt, and an organic peroxide.

Moreover, the tension rubber layer may have a first surface in which a first plurality of teeth or cogs are formed are formed at regularly spaced intervals, and the compression rubber layer has a first surface in which a second plurality of teeth or cogs are formed at regularly spaced intervals. The first plurality of teeth or cogs may be aligned with the second plurality of teeth or cogs.

DETAILED DESCRIPTION OF THE INVENTION

Figure 1:
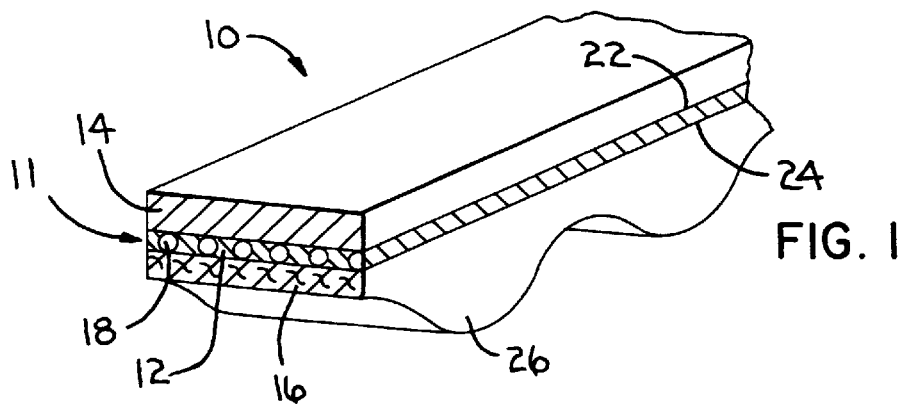
FIG. 1 is a fragmentary, perspective, cross-sectional view of one form of power transmission belt according to the present invention having one surface on which teeth/cogs are formed.

FIG. 1 shows an embodiment of the present invention for a transmission belt 10, having a body 11 defined by a cushion rubber layer 12, a tension rubber layer 14, and a compression rubber layer 16. The cushion body layer 12 has a number of load carrying cords 18 embedded therein and extending in the longitudinal direction of the belt 10. The tension rubber layer 14 is laminated to a first, upper surface 22 of the cushion rubber layer 12. The compression rubber layer 16 is laminated along a second, lower surface 24 of the cushion rubber layer 12. Teeth/cogs 26 are formed in the compression rubber layer 16 and are spaced regularly along the length of the body 11.

The load carrying cords 18 are preferably twisted ropes formed of fibers having a low elongation and a high strength. Examples of suitable materials for use in the cords 18 include aramid fibers, polyamide fibers, polyester fibers, and inorganic fibers such as glass fibers and metallic fibers.

The cords 18 are embedded in the cushion rubber layer 12 and bonded firmly thereto through the use of a mixture of resorcin, formalin and latex which is deposited on the surface of the cords 18. Rubber cement or the like may be applied to the surface of the cords 18 which has previously been treated with the mixture of resorcin, formalin and latex to improve bonding between the cords 18 and the cushion rubber layer 12.

Examples of suitable materials for use in the cushion rubber layer 12 include a hydrogenated nitrile rubber having dispersed therein an unsaturated carboxylic acid metal salt, a hydrogenated nitrile rubber, a chlorosulfonated polyethylene, a natural rubber, a chloroprene rubber, a styrene butadiene rubber, a butadiene rubber or a blend thereof. Preferably, the cushion rubber layer 12 includes a hydrogenated nitrile rubber, an unsaturated carboxylic acid metal salt, an organic peroxide for cross linking and silica.

In the preferred cushion rubber layer 12, the hydrogenated nitrile rubber used is not particularly limited to any specific hydrogenated nitrile rubber. Preferably, the hydrogenated nitrile rubber is a hydrogenated nitrile rubber having a Mooney viscosity (ML1+4 (100° C.)) of approximately 70 to 85. Such a hydrogenated nitrile rubber is believed to increase the mechanical strength and the side pressure resistance and improve the bending property and processability of the cushion rubber composition.

Similarly, in the preferred cushion rubber composition, the unsaturated carboxylic acid metal salt may be formed by ionically bonding a carboxyl group containing unsaturated carboxylic acid with a metal. Examples of suitable unsaturated carboxylic acids include monocarboxylic acids, such as acrylic acid and methacrylic acid; and dicarboxylic acids, such as maleic acid, fumaric acid, and itaconic acid. Examples of suitable metals include beryllium, magnesium, calcium, strontium, barium, titanium, chromium, molybdenum, manganese, iron, cobalt, nickel, copper, silver, zinc, cadmium, aluminum, tin, lead, and antimony.

The ratio of the hydrogenated nitrile rubber to the unsaturated carboxylic acid metal salt in the preferred cushion rubber composition is between 98:2 and 55:45. If the hydrogenated nitrile rubber percentage exceeds 98, it is believed that the wear resistance is adversely affected. If the hydrogenated nitrile rubber percentage is less than 55, the wear resistance may be acceptable, but it is thought that the bending properties of the belt are adversely affected.

As noted above, the preferred cushion rubber composition includes an organic peroxide as a crosslinking agent. Examples of suitable organic peroxides include di-tert-butyl peroxide, dicumyl peroxide, tert-butylcumyl peroxide, 1.1-tert-butylperoxy-3.3.5-trimethylcyclohexane, 2.5-dimethyl-2.5-di(tert-butylperoxy)hexane, 2.5-dimethyl-2.5-di(tert-butylperoxy)hexane-3, bis(tert-butylperoxydiisopropyl)) benzene, 2.5-dimethyl-2.5-di(benzoylperoxy)hexane, tert-butyl peroxybenzoate, and tert-butylperoxy-2-ethylhexyl carbonate. The amount of organic peroxide in the cushion rubber composition is between approximately 0.2 and 10 parts by weight per 100 parts by weight of the cushion rubber composition. When the amount of organic peroxide is less than 0.2 parts by weight, it is believed that the crosslinking is not satisfactory. When the amount of organic peroxide exceeds 10 parts by weight, it is believed that the elasticity of the composition is inadequate.

It is believed that the organic peroxide tends to be influenced by the pH of the rubber composition, and may cause ionic decomposition in an acidic atmosphere. Accordingly, to adjust the pH, a basic substance may be added thereto. Examples of suitable basic substances include magnesium oxide, triethanolamine, diphenylguanidine and hexamethylenetetramine.

The amount of basic substance added varies depending on the type. Preferably, the amount of basic substance added is between approximately 0.5 and 10 parts by weight per 100 parts by weight of the rubber composition defined by the hydrogenated nitrile rubber and the unsaturated carboxylic acid metal salt. If less than 0.5 parts by weight is used, the effect of the pH adjustment may be inadequate. If the amount of basic substance added exceeds 10 parts by weight, the viscosity of the rubber composition is increased in the non-crosslinked state, and the processability is decreased, and the hardness after the crosslinking is increased, with the result that cracking may occur.

Silica is incorporated into the cushion rubber composition in an amount of approximately 5 to 50 parts by weight per 100 parts by weight of the rubber composition defined by of the hydrogenated nitrile rubber and the unsaturated carboxylic acid metal salt. If the amount of silica is less than approximately 5 parts by weight, it is believed that the adhesion between the cords 18 and the cushion rubber layer 20 is inadequate. If the amount of silica exceeds 50 parts by weight, it is believed that the viscosity is so high in the non-crosslinked state that processability of the composition is decreased, and the hardness after the crosslinking is higher than as required, with the result that cracking may occur.

Alternatively, the cushion rubber composition may be formed by blending a master batch prepared by dispersing the unsaturated carboxylic acid metal salt into a first quantity of hydrogenated nitrile rubber, then combining the master batch with an additional amount of hydrogenated nitrile rubber, and then adding the silica and the organic peroxide for crosslinking. Using this method, the master batch, preferably containing 10 to 100 parts by weight of the unsaturated carboxylic acid metal salt and 100 parts by weight of the first quantity of hydrogenated nitrile rubber, is blended with the additional amount of the hydrogenated nitrile rubber in a ratio of from 20:80 to 90:10.

If the amount of the unsaturated carboxylic acid metal salt is less than 10 parts by weight in the master batch, it is believed that the reinforcing effect is decreased, and the wear resistance is inadequate. If the amount of unsaturated carboxylic acid metal salt in the master batch exceeds 100 parts by weight, it is believed that the wear resistance is improved, but the resistance to fatigue from flexing is decreased.

If the amount of the master batch added to the additional amount of hydrogenated nitrile rubber is less than 20 parts by weight, it is believed that the wear resistance and/or the side pressure resistance are inadequate. When the amount of the master batch added to the additional amount of hydrogenated nitrile rubber exceeds 90 parts by weight, it is believed that the flexibility of the cushion rubber composition is decreased.

Similarly, suitable examples of the rubber composition used in the tension rubber layer 14 to be laminated on and to adhered to the upper surface 22 of the cushion rubber layer 12 include the same materials suggested for use in the cushion rubber composition, as detailed above.

In addition, it would be apparent to one of ordinary skill in the art that the cushion rubber composition and the rubber composition used in the tension rubber layer 14 may be a vulcanized or crosslinked rubber. Moreover, the cushion rubber composition and the rubber composition used in the tension rubber layer 14 may include various other suitable additives such as a reinforcing agent, for example, carbon black or silica; a filler, for example, calcium carbonate or talc; a crosslinking aid; a vulcanization accelerator; a plasticizer; a stabilizer; a processing aid; an antioxidant; and/or a coloring agent.

The rubber composition forming the compression rubber layer 16 is obtained by blending a hydrogenated nitrile rubber, an unsaturated carboxylic acid metal salt, short fibers and an organic peroxide for crosslinking. It is believed that if the hydrogenated nitrile rubber, having the excellent heat resistance, is blended with the unsaturated carboxylic acid metal salt, the rubber composition will also have an excellent heat resistance as well as high strength and excellent wear resistance.

In the preferred rubber composition, the hydrogenated nitrile rubber used is not particularly limited to any specific hydrogenated nitrile rubber. Preferably, the hydrogenated nitrile rubber is a hydrogenated nitrile rubber having a Mooney viscosity (ML1+4 (100° C.)) of approximately 70 to 85. Such a hydrogenated nitrile rubber is believed to increase the mechanical strength and the side pressure resistance and improve the bending property and processability of the rubber composition.

Similarly, in the preferred rubber composition, the unsaturated carboxylic acid metal salt may be formed by ionically bonding a carboxyl group containing unsaturated carboxylic acid with a metal. Examples of suitable unsaturated carboxylic acids include monocarboxylic acids, such as acrylic acid and methacrylic acid; and dicarboxylic acids, such as maleic acid, fumaric acid, and itaconic acid. Examples of suitable metals include beryllium, magnesium, calcium, strontium, barium, titanium, chromium, molybdenum, manganese, iron, cobalt, nickel, copper, silver, zinc, cadmium, aluminum, tin, lead, and antimony.

The ratio of the hydrogenated nitrile rubber to the unsaturated carboxylic acid metal salt in the preferred rubber composition is between 98:2 and 55:45. If the hydrogenated nitrile rubber percentage exceeds 98, it is believed that the wear resistance is adversely affected. If the hydrogenated nitrile rubber percentage is less than 55, the wear resistance may be acceptable, but it is though that the bending properties of the belt are adversely affected.

As noted above, the preferred rubber composition includes an organic peroxide as a crosslinking agent. Examples of suitable organic peroxides include di-tert-butyl peroxide, dicumyl peroxide, tert-butylcumyl peroxide, 1.1-tert-butylperoxy-3.3.5-trimethylcyclohexane, 2.5-dimethyl-2.5-di(tert-butylperoxy)hexane, 2.5-dimethyl-2.5-di(tert-butylperoxy)hexane-3, bis(tert-butylperoxydiisopropyl))benzene, 2.5-dimethyl-2.5-di(benzoylperoxy)hexane, tert-butyl peroxybenzoate, and tert-butylperoxy-2-ethylhexyl carbonate.

The amount of organic peroxide in the rubber composition is between approximately 0.2 and 10 parts by weight per 100 parts by weight of the rubber composition. When the amount of organic peroxide is less than 0.2 parts by weight, it is believed that the crosslinking is not satisfactory. When the amount of organic peroxide exceeds 10 parts by weight, it is believed that elasticity of the composition is inadequate.

It is believed that the organic peroxide tends to be influenced by the pH of the rubber composition, and may cause ionic decomposition in an acidic atmosphere.

Accordingly, to adjust the pH, a basic substance may be added thereto. Examples of suitable basic substances include magnesium oxide, triethanolamine, diphenylguanidine and hexamethylenetetramine.

The amount of basic substance added varies depending on the type. Preferably, the amount of basic substance added is between approximately 0.5 and 10 parts by weight per 100 parts by weight of the rubber composition defined by the hydrogenated nitrile rubber and the unsaturated carboxylic acid metal salt. If less than 0.5 parts by weight is used, the effect of the pH adjustment may be inadequate. If the amount of basic substance added exceeds 10 parts by weight, the viscosity of the rubber composition is increased in the non-crosslinked state, and the processability is decreased, and the hardness after the crosslinking is increased, with the result that cracking may occur.

As also noted above, the rubber composition preferably contains short fibers. The short fibers used are oriented in the direction transverse to the longitudinal direction of the belt 10. It is through by so arranging the fibers, the side pressure resistance will be increased and the coefficient of friction will be decreased. Examples of suitable short fibers include cotton short fibers, polyester short fibers, polyamide short fibers and aramid short fibers.

The amount of the short fibers incorporated into the rubber composition is between 5 and 40 parts by weight per 100 parts by weight of the rubber composition. If the amount of short fibers incorporated into the rubber composition is less than 5 parts by weight, it is believed that the side pressure resistance and the reduction in the coefficient of friction are inadequate. If the amount of short fibers exceeds 40 parts by weight, it may be difficult to knead the rubber composition, and it is believed that the resistance to fatigue from flexing and the heat-resistant running life are adversely affected.

If the short fibers are bonded with the remainder of the rubber composition, it is believed that the belt life may be increased. To bond the short fibers with the remainder of the rubber composition the short fibers are dipped in an epoxy-type treating solution and then heated to effect drying. Subsequently, epoxy-coated short fibers are dipped in a mixture (RFL treating solution) of resorcin, formalin and rubber latex and then heat treated.

The epoxy-type treating solution used is preferably a water-soluble epoxy resin-type treating solution. Most preferably, the water-soluble epoxy resin-type treating solution is a solution sold commercially under the trade name NBR010A by Du Pont.

An epoxy-type treating solution composed of an epoxy compound having at least two epoxy groups in a molecule may also be used. Suitable examples of such an epoxy compound include diglycerol, triglycerol tetraglycidyl ether and tetraglycerol pentaglycidyl ether.

The RFL treating solution used is preferably a solution in which the molar ratio of resorcin to formalin is between 1:2 and 2:1, and the ratio of the solid content of the rubber latex to the solid content of resorcin and formalin is between 1:1 and 1:10.

Examples of rubber latex suitable for use in the RFL treating solution include acrylonitrile-butadiene copolymer rubber latex, carboxylated acrylonitrile-butadiene copolymer rubber latex, styrene-butadiene copolymer rubber latex, vinylpyridine rubber latex, and chlorosulfonated polyethylene rubber latex. Most preferably, the latex is the acrylonitrile-butadiene copolymer rubber latex.

Alternatively, the cushion rubber composition may formed by blending a master batch prepared by dispersing the unsaturated carboxylic acid metal salt into a first quantity of hydrogenated nitrile rubber, then combining the master batch with an additional amount of hydrogenated nitrile rubber, and then adding the short fibers and the organic peroxide for crosslinking. Using this method, the master batch, preferably containing 10 to 100 parts by weight of the unsaturated carboxylic acid metal salt and 100 parts by weight of the first quantity of hydrogenated nitrile rubber, is blended with the additional amount of the hydrogenated nitrile rubber in a ratio of from 20:80 to 90:10.

If the amount of the unsaturated carboxylic acid metal salt is less than 10 parts by weight in the master batch, it is believed that the reinforcing effect is decreased, and the wear resistance is inadequate. If the amount of unsaturated carboxylic acid metal salt in the master batch exceeds 100 parts by weight, it is believed that the wear resistance is improved, but the resistance to fatigue from flexing is decreased.

If the amount of the master batch added to the additional amount of hydrogenated nitrile rubber is less than 20 parts by weight, it is believed that the wear resistance and/or the side pressure resistance are inadequate. When the amount of the master batch added to the additional amount of hydrogenated nitrile rubber exceeds 90 parts by weight, it is believed that the flexibility of the rubber composition is decreased.

The rubber of the compression rubber layer 16 may contain various additives which are conventionally used, such as a reinforcing agent, for example, carbon black or silica; a filler to improve wear resistance, for example, calcium carbonate or talc; a crosslinking aid; a vulcanization accelerator; a plasticizer; a stabilizer; a processing aid; an antioxidant; and/or a coloring agent.

A metal oxide, such as magnesium oxide, zinc oxide, or the like may be incorporated to increase the hardness of the rubber, and the amount thereof is approximately between 0.5 and 10 parts by weight per 100 parts by weight of the rubber composition defined by the hydrogenated nitrile rubber and the unsaturated carboxylic acid metal salt.

The rubber and the various additives are mixed by a usual method such as by using a Banbury mixer or a kneader.

Figure 2:
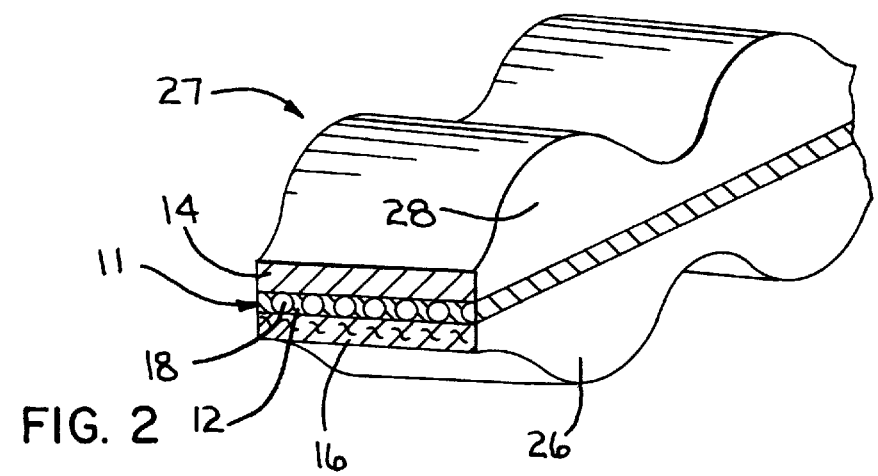
FIG. 2 is a fragmentary, perspective, cross-sectional view of another form of power transmission belt according to the present invention having oppositely facing surfaces on which teeth/cogs are formed.

FIG. 2 shows another embodiment of the present invention for a transmission belt 27 similar to that shown in FIG. 1, with similar elements numbered the same. FIG. 2 differs from FIG. 1 in that teeth/cogs 28 are also formed in the tension rubber layer 14.

Figure 3:
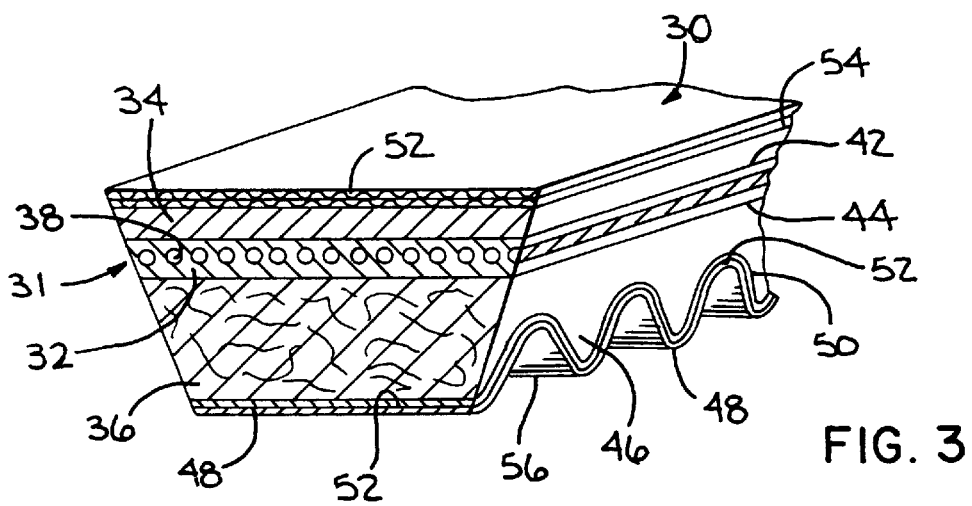
FIG. 3 is a fragmentary, perspective, cross-sectional view of another form of power transmission belt according to the present invention having a layer of crack-preventing material laminated thereto and in which teeth/cogs are formed.

FIG. 3 shows an additional embodiment of the present invention for a transmission belt 30. Similar to the embodiments shown in FIGS. 1 and 2, FIG. 3 shows a body 31 having a cushion rubber layer 32, a tension rubber layer 34, and a compression rubber layer 36. The cushion rubber layer 32 includes a number of load carrying cords 38 embedded therein and extending in the longitudinal direction of the belt 30. The tension rubber layer 34 is laminated to a first, upper surface 42 of the cushion rubber layer 32. The compression rubber layer 36 is laminated along a second, lower surface 44 of the cushion rubber layer 32. Teeth/cogs 46 are formed in the compression rubber layer 36 at regularly spaced intervals along the length of the belt 30.

The embodiment shown in FIG. 3 differs from the embodiments shown in FIGS. 1 and 2 in the application of a layer 48 of crack-resisting material on the lower surface 50 of the compression rubber layer 36. Also a fabric layer 52, as is known in the art, is applied on an upper surface 54 of the tension rubber layer 34 and over the crack-resisting layer 48.

The crack-resisting layer 48 has the same formulation as the compression rubber layer, except that the formulation of the crack-resisting layer 48 does not include or is free of short fiber and/or carbon black. It is believed that the elimination of the short fibers from the crack-resisting layer 48 may increase the flexibility of the belt 30, and thereby increase the crack-resisting properties of the belt 30.

The thickness of the crack-resisting layer 48 is preferably between 0.5 and 3 mm. If the thickness of the layer 48 is less than 0.5 mm, the crack propagation resistance may be inadequate. If the thickness of the layer 48 exceeds 3 mm, the side pressure resistance of the belt 30 is decreased.

Alternatively, the crack-resisting layer 48 may be laminated in a position more proximate to the portion of the compression rubber layer 36 wherein cracking may occur when the belt 30 is inversely bent, for example, in a position proximate to the base of a recess 56 between adjacent teeth/cogs 46.

Figure 4:
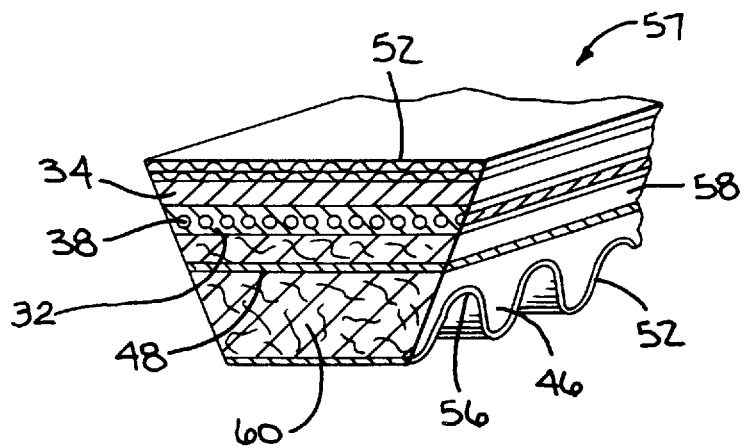
FIG. 4 is a fragmentary, perspective, cross-sectional view of a further form of power transmission belt according to the present invention having a layer of crack-preventing material spaced from a surface in which teeth/cogs are formed.
Figure 5:
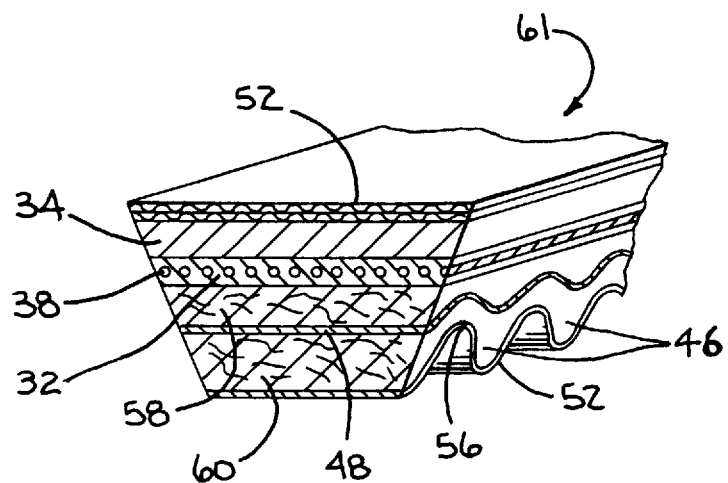
FIG. 5 is a fragmentary, perspective, cross-sectional view of a still further form of power transmission belt according to the present invention in which a layer of crack-preventing material is shaped to conform to teeth/cogs formed in a surface of the belt.

A still further embodiment of the present invention is shown at 57 in FIG. 4, and is similar to the belt 30 in FIG. 3, with similar parts numbered the same. In the embodiment shown in FIG. 4, the crack resisting layer 48 is laminated between two compression rubber layers 58, 60 parallel to the cushion rubber layer 32. As shown, the crack-resisting layer 48 is laminated in a position proximate to the base of the recess 56 between adjacent teeth/cogs 46. Further, as shown in FIG. 5 with reference to another embodiment of the present invention shown at 61, the crack-resisting layer 48 may be laminated in a wavy form in a position proximate to the base of the recess 56 between adjoining teeth/cogs 46.

The above-mentioned belt finds use in a raw edge toothed/cog belt which is used as a variable-speed driving belt in a high-temperature atmosphere of a snowmobile, a scooter, or the like. The raw edge toothed/cog belt may be a belt having teeth/cogs only in the compression rubber layer which is situated at a lower portion of the belt, or a double-toothed/cog belt having teeth/cogs also in the tension rubber layer which is situated at an upper portion of the belt in order to further improve the bending properties of the belt.

EXAMPLES

The function and performance of embodiments of the present invention are illustrated in greater detail with reference to the following Examples.

In Example A, the compositions listed as Examples 1 to 3 and Comparative Examples 1 to 6 in Table 1 were kneaded to form a rubber, and properties of the rubber were measured.

TABLE 1

|  | example 1 | example 2 | example 3 | comparative example 1 | comparative example 2 | comparative example 3 | comparative example 4 | comparative example 5 | comparative example 6 |
|---|---|---|---|---|---|---|---|---|---|
| chloroprene rubber |  |  |  |  |  |  |  |  | 100 |
| hydrogenated nitrile butadiene rubber | 30 | 40 | 50 | 5 | 85 | 40 | 40 | 40 |  |
| zinc polymethacrylate-modified hydrogenated nitrile butadiene rubber | 70 | 60 | 50 | 95 | 15 | 60 | 60 | 60 |  |
| aramid short fibers | 20 | 20 | 20 | 20 | 20 | 3 | 45 | 20 | 20 |
| stearic acid |  |  |  |  |  |  |  |  | 2 |
| magnesium oxide |  |  |  |  |  |  |  |  | 4 |
| plasticizer |  |  |  |  |  |  |  |  | 10 |
| HAF carbon black |  |  |  |  |  |  |  |  | 40 |
| octylated diphenylamine |  |  |  |  |  |  |  |  | 2 |
| 4,4'-(α,α-dimethylbenzyl) diphenylamine | 2 | 2 | 2 | 2 | 2 | 2 | 2 | 2 |  |
| three types of zinc oxide |  |  |  |  |  |  |  |  | 5 |
| sulfur |  |  |  |  |  |  |  |  | 1 |
| 1,3-bis-(t-butylperoxyisopropyl) benzene | 2 | 2 | 2 | 2 | 2 | 2 | 2 | 2 |  |
| dibenzothyazyl disulfide |  |  |  |  |  |  |  |  | 1 |
| 2-mercaptoimidazoyline |  |  |  |  |  |  |  |  | 0.3 |
| N,N-m-phenylene-dimaleimide |  |  |  |  |  |  |  |  | 3 |
| positions of cogs in compression and tension rubber layers | consistnet | consistent | consistent | consistent | consistent | consistent | consistent | inconsistent | consistent |

Raw edge toothed/cog belts similar in structure to that shown in FIG. 2 were produced using the above-mentioned rubbers, and were subjected to a running test. The results of the test are shown in Table 2.

TABLE 2

|  | position of cogs in compression and tension rubber layers | variable-speed running test (in hours) |
|---|---|---|
| example 1 | consistent | 50 — broken |
| example 2 | consistent | 60 — broken |
| example 3 | consistent | 65 — broken |
| comparative example 1 | consistent | 8 — broken |
| comparative example 2 | consistent | 10 — broken |
| comparative example 3 | consistent | 12 — broken |
| comparative example 4 | consistent | 8 — broken |
| comparative example 5 | inconsistent | 35 — broken |
| comparative example 6 | consistent | 30 — broken |

As is apparent from Table 2, the inventive power transmission belt excelled in terms of the resistance to heat and the resistance to wear as compared with the conventional chloroprene or hydrogenated nitrile rubber belts. Furthermore, it can be seen that the life of the belt is improved by providing teeth/cogs on the upper and lower surfaces wherein the positions of the teeth/cogs in the upper surface are aligned with the teeth/cogs on the lower surface.

In Example B, a raw edge toothed/cog belt, such as is shown in FIG. 3, was made using the rubber compositions for the compression rubber composition, the tension rubber composition, the cushion rubber composition and the crack-resisting rubber composition shown in Table 3. In Example B, the same rubber composition was used in the crack-resisting layer and the cushion rubber layer.

To make the raw edge toothed/cog belt, an untreated cord having a total denier of 6,600 was prepared by twisting polyethylene terephthalate fibers having a denier of 1,100 such that the first fibers and the final fibers were twisted in the opposite direction with the first twist number of 11.4 times/10 cm and the final twist number of 21.0 times/10 cm to give a twist structure of 2×3.

Subsequently, this untreated cord was pre-dipped in an isocyanate-type adhesive, then dried at a temperature of from approximately 170° to 180° C., then dipped in an RFL solution, and finally stretched and heat-set at from 200° to 240° C. to form a treated cord.

The fabric layer was a plain-weave canvas formed of cotton spun yarn. This canvas was dipped in RFL solution, and then heat-treated at 150° C. for 2 minutes to form a treated canvas. Thereafter, this treated canvas was friction-coated with the crack-resisting rubber composition to produce a rubber-coated canvas.

One reinforcing fabric layer was laminated with the crack-resisting rubber (thickness approximately 1.5 mm), an unvulcanized compression rubber layer and an unvulcanized cushion rubber were attached to the fabric in this order. The laminate assembly was mounted on a flat mold having teeth/cogs and notches arranged alternately, and was pressurized at 80° C. to form a toothed/cog pad.

After the preparation of these materials, the toothed/cog pad was wound around a mold with a complementing surface, and the cords, the flat tension rubber layer and a second layer of fabric were wound thereon in this order to form a belt sleeve. Subsequently, a jacket was placed thereon, and the mold was disposed in a vulcanization system and vulcanized. This sleeve was cut to produce raw edge toothed/cog V-belts.

Each of the resulting raw edge toothed/cog belts had an upper width of 35.2 mm, a thickness of 14.5 mm, a length of 1,120 mm, and a tooth depth of 6.8 mm. These belts were subjected to an endurance test, wherein the resistance to fatigue from flexing was evaluated. The results are shown in Table 3.

TABLE 3

|  | example 1 | comparative example 1 | comparative example 2 |
|---|---|---|---|
| compression and tension rubber layers |  |  |  |
| hydrogenated nitrile butadiene rubber | 40 | 40 | 40 |
| zinc polymethacrylate modified hydrogenated nitrile butadiene rubber | 60 | 60 | 60 |

TABLE 3-continued

|  | example 1 | comparative example 1 | comparative example 2 |
|---|---|---|---|
| aramid short fiber | 20 | 20 |  |
| antioxidant | 2 | 2 | 2 |
| organic peroxide | 2 | 2 | 2 |
| crack-resisting rubber layer |  |  |  |
| hydrogenated nitrile butadiene rubber | 40 |  |  |
| zinc polymethacrylate modified hydrogenated nitrile butadiene rubber | 50 |  |  |
| 4,4'-(α-α dimethylbenzyl) diphenylamine | 2 | not used | not used |
| 1,3 bis-(t-butylperoxyisopropyl) benzene | 2 |  |  |
| adhesion rubber | same as crack-resisting layer | same as in example 1 | same as in example 1 |
| results of duration test | no problem in 48 hours | compression layer cracked in 48 hours | compression layer cracked in 35 hours |

The endurance test used is conventionally referred to as an up/down endurance test. In such an up/down test, variable-speed pulleys are mounted on a driving shaft and a driven shaft. The raw edge toothed/cog belt is suspended between these variable-speed pulleys under a predetermined tension. The angular speed of the driving shaft is then varied from 0 to 6,000 rpm, while the driven shaft is adjusted to provide a varying load of from 0 to 40 ps. In particular, the driving shaft is first rotated at 6,000 rpm for a few seconds, and then held at 0 rpm for a few seconds. The speed of the driving shaft is repeatedly varied between the two extremes to evaluate the durability of the belt.

As is clear from Table 3, the power transmission belt of the present invention did not crack, and exhibited an excellent resistance to fatigue from flexing.

Still other aspects, objects, and advantages of the present invention can be obtained from a study of the specification, the drawings, and the appended claims.

We claim:

1. A power transmission belt comprising:
a body comprising:
  (a) a cushion rubber layer with a load carrying cord embedded therein, the cushion rubber layer comprising a first rubber composition comprising a hydrogenated nitrile rubber, an unsaturated carboxylic acid metal salt, silica and an organic peroxide; and
  (b) a compression rubber layer disposed on the cushion rubber layer and comprising a second rubber composition comprising a hydrogenated nitrile rubber, an unsaturated carboxylic acid metal salt, and an organic peroxide.

2. The power transmission belt according to claim 1, wherein the second rubber composition further comprising short fibers, the short fibers selected from the group consisting of cotton fibers, polyester fibers, polyamide fibers and aramid fibers.

3. The power transmission belt according to claim 2, wherein the amount of short fibers in the second rubber composition is between 5 and 40 parts by weight per 100 parts by weight of the second rubber composition.

4. The power transmission belt according to claim 1, wherein in the first rubber composition:

the hydrogenated nitrile rubber is a hydrogenated nitrile rubber having a Mooney viscosity of approximately 70 to 85;

the unsaturated carboxylic acid metal salt is formed by ionically bonding an unsaturated carboxylic acid selected from the group consisting of monocarboxylic acids and dicarboxylic acids and a metal selected from the group consisting of beryllium, magnesium, calcium, strontium, barium, titanium, chromium, molybdenum, manganese, iron, cobalt, nickel, copper, silver, zinc, cadmium, aluminum, tin, lead, and antimony;

the ratio of hydrogenated nitrile rubber to unsaturated carboxylic acid metal salt is between 98:2 and 55:45; and the organic peroxide is an organic peroxide selected from the group consisting of di-tert-butyl peroxide, dicumyl peroxide, tert-butylcumyl peroxide, 1.1-tert-butylperoxy-3.3.5-trimethylcyclohexane, 2.5-dimethyl-2.5-di(tert-butylperoxy)hexane, 2.5-dimethyl-2.5-di(tert-butylperoxy)hexane-3, bis(tert-butylperoxydiisopropyl))benzene, 2.5-dimethyl-2.5-di(benzoylperoxy)hexane, tert-butyl peroxybenzoate, and tert-butylperoxy-2-ethylhexyl carbonate in an amount of approximately 0.2 to 10 parts by weight per 100 parts by weight of the first rubber composition.

5. The power transmission belt according to claim 4 wherein the monocarboxylic acid is at least one of acrylic acid and methacrylic acid.

6. The power transmission belt according to claim 4 wherein the dicarboxylic acid is at least one of maleic acid, fumaric acid, and itaconic acid.

7. The power transmission belt according to claim 1, wherein in the second rubber composition:

the hydrogenated nitrile rubber is a hydrogenated nitrile rubber having a Mooney viscosity of approximately 70 to 85;

the unsaturated carboxylic acid metal salt is formed by ionically bonding an unsaturated carboxylic acid selected from the group consisting of monocarboxylic acids and dicarboxylic acids and a metal selected from the group consisting of beryllium, magnesium, calcium, strontium, barium, titanium, chromium, molybdenum, manganese, iron, cobalt, nickel, copper, silver, zinc, cadmium, aluminum, tin, lead, and antimony;

the ratio of hydrogenated nitrile rubber to unsaturated carboxylic acid metal salt is between 98:2 and 55:45; and the organic peroxide is an organic peroxide selected from the group consisting of di-tert-butyl peroxide, dicumyl peroxide, tert-butylcumyl peroxide, 1.1-tert-butylperoxy-3.3.5-trimethylcyclohexane, 2.5-dimethyl-2.5-di(tert-butylperoxy)hexane, 2.5-dimethyl-2.5-di(tert-butylperoxy)hexane-3, bis(tert-butylperoxydiisopropyl))benzene, 2.5-dimethyl-2.5-di(benzoylperoxy)hexane, tert-butyl peroxybenzoate, and tert-butylperoxy-2-ethylhexyl carbonate in an amount of approximately 0.2 to 10 parts by weight per 100 parts by weight of the second rubber composition.

8. The power transmission belt according to claim 7 wherein the monocarboxylic acid is at least one of acrylic acid and methacrylic acid.

9. The power transmission belt according to claim 7 wherein the dicarboxylic acid is at least one of maleic acid, fumaric acid, and itaconic acid.

10. The power transmission belt according to claim 1, wherein the first rubber composition includes silica in an amount of approximately 5 to 50 parts by weight per 100 parts by weight of the first rubber composition.

11. The power transmission belt according to claim 1, wherein the first rubber composition further comprises a basic substance selected from the group consisting of magnesium oxide, triethanolamine, diphenylguanidine and hexamethylenetetramine in an amount of approximately 0.5 to 10 parts by weight per 100 parts by weight of the first rubber composition.

12. The power transmission belt according to claim 1, wherein the second rubber composition further comprises a basic substance selected from the group consisting of magnesium oxide, triethanolamine, diphenylguanidine and hexamethylenetetramine in an amount of approximately 0.5 to 10 parts by weight per 100 parts by weight of the second rubber composition.

13. The power transmission belt according to claim 1, wherein the body further comprises a crack-resisting layer disposed on the compression rubber layer and comprising a substantially fiber-free, substantially carbon black-free rubber composition comprising a hydrogenated nitrile rubber, an unsaturated carboxylic acid metal salt, and an organic peroxide.

14. A power transmission belt comprising:
a body comprising:
(a) a cushion rubber layer with a load carrying cord embedded therein, the cushion rubber layer comprising a first rubber composition;
(b) a compression rubber layer disposed on the cushion rubber layer and comprising a second rubber composition comprising a hydrogenated nitrile rubber, an unsaturated carboxylic acid metal salt, short fibers and an organic peroxide; and
(c) a crack-resisting layer disposed on the compression rubber layer and comprising a substantially fiber-free, substantially carbon black-free rubber composition comprising a hydrogenated nitrile rubber, an unsaturated carboxylic acid metal salt, and an organic peroxide.

15. The power transmission belt according to claim 14, wherein the first rubber composition is selected from the group consisting of a hydrogenated nitrile rubber having dispersed therein an unsaturated carboxylic acid metal salt, a hydrogenated nitrile rubber, a chlorosulfonated polyethylene, a natural rubber, a chloroprene rubber, a styrene butadiene rubber, a butadiene rubber or a blend thereof.

16. The power transmission belt according to claim 14, wherein the first rubber composition comprises:

a hydrogenated nitrile rubber is a hydrogenated nitrile rubber having a Mooney viscosity of approximately 70 to 85;

an unsaturated carboxylic acid metal salt is formed by ionically bonding an unsaturated carboxylic acid selected from the group consisting of monocarboxylic acids and dicarboxylic acids and a metal selected from the group consisting of beryllium, magnesium, calcium, strontium, barium, titanium, chromium, molybdenum, manganese, iron, cobalt, nickel, copper, silver, zinc, cadmium, aluminum, tin, lead, and antimony;

the ratio of hydrogenated nitrile rubber to unsaturated carboxylic acid meal salt is between 98:2 and 55:45;

silica in an amount of approximately 5 to 50 parts by weight per 100 parts by weight of the first rubber composition; and an organic peroxide is an organic peroxide selected from the group consisting of di-tert-butyl peroxide, dicumyl peroxide, tert-butylcumyl peroxide, 1.1-tert-butylperoxy-3.3.5-trimethylcyclohexane, 2.5-dimethyl-2.5-di(tert-butylperoxy)hexane, 2.5-dimethyl-2.5-di(tert-butylperoxy)hexane-3, bis(tert-butylperoxydiisopropyl))benzene, 2.5-dimethyl-2.5-di(benzoylperoxy)hexane, tert-butyl peroxybenzoate, and tert-butylperoxy-2-ethylhexyl carbonate in an amount of approximately 0.2 to 10 parts by weight per 100 parts by weight of the first rubber composition.

17. The power transmission belt according to claim 16 wherein the monocarboxylic acid is at least one of acrylic acid and methacrylic acid.

18. The power transmission belt according to claim 16 wherein the dicarboxylic acid is at least one of maleic acid, fumaric acid, and itaconic acid.

19. The transmission belt according to claim 14 wherein in the second rubber composition:

the hydrogenated nitrile rubber is a hydrogenated nitrile rubber having a Mooney viscosity of approximately 70 to 85;

the unsaturated carboxylic acid metal salt is formed by ionically bonding an unsaturated carboxylic acid selected from the group consisting of monocarboxylic acids and dicarboxylic acids and a metal selected from the group consisting of beryllium, magnesium, calcium, strontium, barium, titanium, chromium, molybdenum, manganese, iron, cobalt, nickel, copper, silver, zinc, cadmium, aluminum, tin, lead, and antimony;

the ratio of hydrogenated nitrile rubber to unsaturated carboxylic acid meal salt is between 98:2 and 55:45;

the short fibers are selected from the group consisting of cotton fibers, polyester fibers, polyamide fibers and aramid fibers in an the amount of approximately 5 and 40 parts by weight per 100 parts by weight of the second rubber composition; and the organic peroxide is an organic peroxide selected from the group consisting of di-tert-butyl peroxide, dicumyl peroxide, tert-butylcumyl peroxide, 1.1-tert-butylperoxy-3.3.5-trimethylcyclohexane, 2.5-dimethyl-2.5-di(tert-butylperoxy)hexane, 2.5-dimethyl-2.5-di(tert-butylperoxy)hexane-3, bis(tert-butylperoxydiisopropyl))benzene, 2.5-dimethyl-2.5-di(benzoylperoxy)hexane, tert-butyl peroxybenzoate, and tert-butylperoxy-2-ethylhexyl carbonate in an amount of approximately 0.2 to 10 parts by weight per 100 parts by weight of the second rubber composition.

20. The power transmission belt according to claim 19 wherein the monocarboxylic acid is at least one of acrylic acid and methacrylic acid.

21. The power transmission belt according to claim 19 wherein the dicarboxylic acid is at least one of maleic acid, fumaric acid, and itaconic acid.

22. The transmission belt according to claim 14, wherein in the substantially fiber-free, substantially carbon black-free rubber composition:

the hydrogenated nitrile rubber is a hydrogenated nitrile rubber having a Mooney viscosity of approximately 70 to 85;

the unsaturated carboxylic acid metal salt is formed by ionically bonding an unsaturated carboxylic acid selected from the group consisting of monocarboxylic acids and dicarboxylic acids and a metal selected from the group consisting of beryllium, magnesium, calcium, strontium, barium, titanium, chromium, molybdenum, manganese, iron, cobalt, nickel, copper, silver, zinc, cadmium, aluminum, tin, lead, and antimony;

the ratio of hydrogenated nitrile rubber to unsaturated carboxylic acid meal salt is between 98:2 and 55:45; and the organic peroxide is an organic peroxide selected from the group consisting of di-tert-butyl peroxide, dicumyl peroxide, tert-butylcumyl peroxide, 1.1-tert-butylperoxy-3.3.5-trimethylcyclohexane, 2.5-dimethyl-2.5-di(tert-butylperoxy)hexane, 2.5-dimethyl-2.5-di(tert-butylperoxy)hexane-3, bis(tert-butylperoxydiisopropyl))benzene, 2.5-dimethyl-2.5-di(benzoylperoxy)hexane, tert-butyl peroxybenzoate, and tert-butylperoxy-2-ethylhexyl carbonate in an amount of approximately 0.2 to 10 parts by weight per 100 parts by weight of the second rubber composition.

23. The power transmission belt according to claim 22 wherein the monocarboxylic acid is at least one of acrylic acid and methacrylic acid.

24. The power transmission belt according to claim 22 wherein the dicarboxylic acid is at least one of maleic acid, fumaric acid, and itaconic acid.

25. A power transmission belt comprising:

a body comprising:

(a) a cushion rubber layer with a load carrying cord embedded therein, the cushion rubber layer comprising a first rubber composition comprising a hydrogenated nitrile rubber, an unsaturated carboxylic acid metal salt, silica and an organic peroxide;

(b) a compression rubber layer disposed on the cushion rubber layer and comprising a second rubber composition comprising a hydrogenated nitrile rubber, an unsaturated carboxylic acid metal salt, short fibers and an organic peroxide; and (c) a crack-resisting layer disposed on the compression rubber layer and comprising a substantially fiber-free, substantially carbon black-free rubber composition comprising a hydrogenated nitrile rubber, an unsaturated carboxylic acid metal salt, and an organic peroxide.

26. The power transmission belt according to claim 25 wherein:

the compression rubber layer has a first surface in which teeth or cogs are formed at regularly spaced intervals; and the crack-resisting layer is disposed on the first surface of the compression rubber layer.

27. The power transmission belt according to claim 25 the body further comprising an outer compression rubber layer disposed on the crack-resisting layer, the crack-resisting layer disposed between the compression rubber layer and the outer compression rubber layer.

28. The power transmission belt according to claim 25 wherein:

the cushion rubber layer has upper and lower surfaces;

the compression layer disposed on the lower surface; and the body farther comprising a tension rubber layer disposed on the upper surface of the cushion rubber layer, the tension rubber layer comprising a third rubber composition comprising a hydrogenated nitrile rubber, an unsaturated carboxylic acid metal salt, and an organic peroxide.

29. The power transmission belt according to claim 28, wherein the tension rubber layer has a first surface in which a first plurality of teeth or cogs are formed are formed at regularly spaced intervals;

the compression rubber layer has a first surface in which a second plurality of teeth or cogs are formed at regularly spaced intervals; and the first plurality of teeth or cogs are aligned with the second plurality of teeth or cogs.

\* \* \* \* \*